United States Patent [19]

Fariello

[11] 3,896,273

[45] July 22, 1975

[54] DIGITAL ECHO SUPPRESSOR

[76] Inventor: Ettore Fariello, Gaithersburg, Md.

[73] Assignee: Communications Satellite Corporation, Washington, D.C.

[22] Filed: Jan. 8, 1971

[21] Appl. No.: 105,069

[52] U.S. Cl. .............................................. 179/170.6

[51] Int. Cl. .............................................. H04b 3/20

[58] Field of Search............ 179/170.2, 170.6, 170.8

[56] References Cited

UNITED STATES PATENTS

| | | | |
|---|---|---|---|
| 3,548,103 | 12/1970 | Fabio | 179/15 |
| 3,560,669 | 2/1971 | Foulkes | 179/170.2 |
| 3,562,448 | 2/1971 | May | 179/170.6 |

*Primary Examiner*—Kathleen H. Claffy
*Assistant Examiner*—William A. Helvestine
*Attorney, Agent, or Firm*—Martin C. Fliesler and Alan J. Kasper

[57] ABSTRACT

A digital echo suppressor comprising a digital voice level detector which detects the instantaneous signal amplitude of voice being received over one line of a 4-wire transmission path. To suppress the echo of this signal the digital voice level detector activates for a predetermined period of time a gate generator which controls an associated threshold generator. The threshold generator adjusts the threshold in a digital level comparator to a level equal to $n$ dB below the level of the received signal amplitude. The echo of the received signal, which is attenuated an amount equal to $(n + 1)$ dB by a hybrid, is compared in the digital level comparator with the threshold level. Since the attenuated received signal amplitude level does not exceed the threshold level, the return path of the 4-wire transmission path is disabled by maintaining open an echo suppression switch. Break-in means are provided to enable a softer talker to break-in to a louder talker and to maintain the circuit after break-in even if the softer talker's speech power decreases.

14 Claims, 6 Drawing Figures

C = CLOCK INPUT OF THE COUNTER

B/64 = THE FRAME CLOCK OF THE CODEC DIVIDED BY 64 (THE PERIOD OF B/64 IS 8 msec)

$Q_{16}$ = THE 4TH STAGE OUTPUT $DR_4$ = THE DIRECT RESET OF THE 4TH STAGE OF THE COUNTER $DS_1$ = THE DIRECT SET OF THE 1ST STAGE OF THE COUNTER $S_1, S_2$ = SERIAL BIT STREAM INPUTS OF THE TWO PCM WORDS $B_1$ = PCM FRAME CLOCK PHASED WITH THE 1ST DIGIT OF THE PCM WORD

D = DISABLE OF LOGIC 22

DIGITAL ECHO SUPPRESSOR

BACKGROUND OF THE INVENTION

1. Field of the Invention

This invention relates to echo suppressors and more particularly to the use of a digital echo suppressor in transmission systems having extended round-trip time delays in the speech path.

2. Description of the Prior Art

In many communications systems it is the usual practice to interconnect two-wire local lines at a terminal to four-wire lines via a hybrid or other insolation network. The mixed system is particularly common in communications facilities such as radio relay circuits. The four-wire system provides separate one-way paths for transmission and reception of signal energy between terminals while the two-wire local circuit provides a single two-way path between the terminal and the subscriber. When signal energy is coupled to a two-wire local line by one of the paths of the four-wire circuit a part of the signal returns over the other path of the four-wire line. The part of the signal which returns over the other four-wire line to the terminal where the signal originated is commonly known as echo. Echo is generated because the hybrid or other isolation network employed is never a perfect isolator.

When the round-trip delay in the four-wire transmission circuit is small echo will present little or no problem. However, certain transmission systems, such as those employing a stationary orbit earth satellite as a repeater station, or a transmission system utilizing long lines for the transmission of signal energy, can cause overall time delays of as much as 600 milliseconds. Under these circumstances failure to provide for attenuation of the echo leads to subscriber dissatisfaction since the subscriber will hear his own speech delayed by 600 mseconds and will perceive this as a very disconcerting echo.

In the past, echo suppressors have been used to provide a partial solution to the echo problem. For example, split, switching type echo suppressors have been used for many years to reduce the echo, wherein each suppressor is located near the terminals on the four-wire side of the communication facility. When a far-end talker begins to speak his signal is detected at the echo suppressor of the near-end talker by a voice detector. Upon detection of the far-end talker's speech an echo suppression switch on the echo return path is opened thereby disabling the echo return path and preventing the echo from returning to the far-end talker. Break-in circuitry is also provided should the near-end talker desire to talk while the far-end talker is talking. In this latter condition a break-in switch in parallel with the echo suppression switch is closed in response to a signal from a voice comparator. The voice comparator compares the signal being received by the near-end talker and the signal being transmitted by the near-end talker. When the signal amplitude of the latter is greater than or equal to the signal amplitude of the former the break-in switch overrides the echo suppression switch and enables the return path.

One disadvantage with this type of echo suppressor is that it is analog rather than digital in nature. Both the voice detector and voice comparator in most of these echo suppressors detect the signal amplitude on a RMS type of basis rather than the instantaneous value of the signals. As a result they require a relatively long delay after the initial detection of a speech signal before an output is produced. This is due to the fact that the voice detector and comparator perform integrating function which requires a certain amount of time for the detected signal to build up to a level which exceeds the threshold level of the detector or comparator required for an output to be produced. For example, the turn-on time of the comparator and voice detector may be as high as 4 msecs. The consequences are such that the far-end talker may receive an initial echo when he begins to speak since the transmission time of his signal between the point at which his speech in the near-end talker receive path is initially detected by the voice detector and the point at which echo arrives at the echo suppression switch in the return path is shorter than the time needed to disable the return path. Also, there will be clipping of the near-end talker's speech during break-in since the voice comparator will require 4 msecs to close the break-in switch which enables the return path. Though the "turn-on" time of the analog voice comparator and voice detector has been reduced in advanced echo suppressors, such echo suppressors are relatively expensive and more difficult to design.

Another disadvantage of such prior art echo suppressors occurs during the break-in period of the near-end talker. The signal power of the near-end talker must be greater than or equal to the signal power of the far-end talker for break-in to occur and then clipping of the near-end talker's speech will still occur. Only after break-in is the near-end talker able to maintain a circuit connection with a voice power lower than that of the far-end talker.

Another disadvantage of such prior art echo suppressors occurs when the signal power being received by the near-end talker is decreasing. The echo signal power being detected by the voice comparator may be greater than the signal power being detected in the receive path and, therefore, the return path may be enabled. Since the return path is enabled, the far-end talker may hear echo.

The echo suppressor of the present invention has several advantages over the prior analog echo suppressors. These advantages will be briefly mentioned here but will become apparent from the detailed discussion of the invention. First, the present invention comprises digital apparatus which can operate immediately to suppress echo. Consequently, the initial echo phenomena discussed previously is avoided, and with relatively inexpensive apparatus. Secondly, the echo phenomena which occurs when the signal power being received by the near-end talker is decreasing is eliminated with the digital echo suppressor of the present invention. Thirdly, with the present invention, a talker desiring to break-in to the speech of the other talker may do so even though his voice power is lower than the voice power of the other talker.

SUMMARY OF THE INVENTION

In accordance with this invention pulse code modulated (PCM) speech signals from a far-end talker are detected at the echo suppressor of the near-end talker by a digital voice level detector. The digital voice level detector detects the instantaneous amplitude of the signals represented by the code words, stores them, and provides a signal to a digital threshold generator. The threshold generator adjusts the threshold of a digital level comparator to $n$ dB below the value of the instantaneous signal amplitude being detected. When the far-end talker's signal reaches the hybrid it is attenuated $(n+1)$ dB prior to returning as echo. The echo is then compared in the digital level comparator with the threshold set at only $n$ dB below the received signal. Since the threshold is not reached the digital level comparator cannot close the echo suppression switch thereby maintaining the return path disabled. The digital level comparator maintains the original threshold level for a period of 50 msec which is about the maximum time required for the received signal to travel from the point of detection by the digital voice level detector to the hybrid and back on the return path to the echo suppression switch. During this time the digital voice level detector detects and stores all the instantaneous values of signal amplitude being received. Should the instantaneous amplitude of the receive signal be increased during this time the threshold in the level comparator is immediately increased accordingly and held for 50 msecs. Should the instantaneous amplitude of the received signal decrease during the 50 msec time period the threshold in the digital level comparator is reset after 50 msec to the level corresponding to the highest instantaneous signal amplitude which occurred during those 50 msecs and is maintained for up to 50 msec from the time that signal was first detected.

When the near-end talker desires to break-in his digitally encoded voice signal is fed to the digital level comparator which has a threshold set at $n$ dB below the signal amplitude of the far-end talker. The near-end talker therefore may break-in by speaking with a voice signal of up to $n$ dB below the voice signal power of the far-end talker. Immediately after break-in occurs a digital attenuator is switched into the receive path of the near-end talker so as to enable attenuation of the received signal prior to detection by the digital level detector. The threshold in the digital comparator is then accordingly lowered, thereby enabling the near-end talker to maintain his transmission circuit closed even though he speaks even softer after break-in.

DETAILED DESCRIPTION OF THE DRAWINGS

Figure 1:
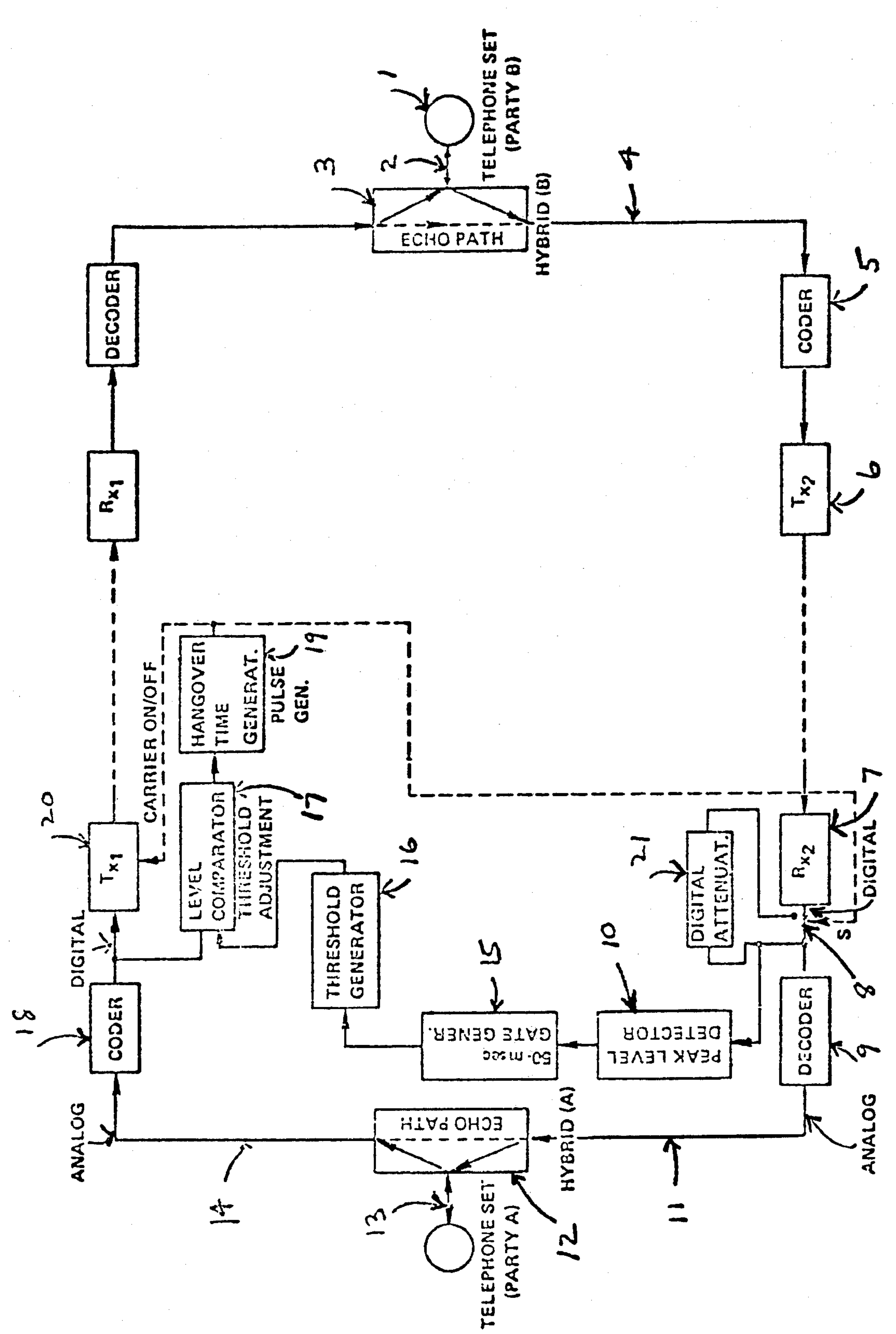
FIG. 1 is a block diagram of a digital transmission system including the digital echo suppressor of the present invention.

Referring to FIG. 1 there is shown a block diagram of a digital transmission system including the digital echo suppressor of the present invention. Though the discussion will assume the presence of the digital echo suppressor only near the subscriber A terminal, a second digital echo suppressor may be placed near the subscriber B terminal. When a call is made by subscriber B the analog voice signal is transmitted from telephone 1 over two-wire circuit 2 to hybrid 3. Hybrid 3 routes the analog signal to circuit 4, which is part of a four-wire transmission facility, for transmission to a conventional coder 5 which encodes the analog signal into PCM words representing the instantaneous signal amplitude as is known in the art. Assuming the digital transmission system is a satellite system the digital signals are transmitted by a ground station transmitter 6 to a satellite (not shown) which relays the digital signals to the intended ground station receiver 7. Upon reception each digital code word is fed via switch 8 to a conventional decoder 9 and to a digital level detector 10. The decoder 9 decodes the digital code words into analog form and transmits the analog signal via circuit 11 of the four-wire facility to hybrid 12. Hybrid 12 routes the analog signal over two-wire facility 13 to the called subscriber A. As illustrated in FIG. 1 hybrid 12, not being a perfect isolator, also routes the analog signal to circuit 14 (the echo return path) which is part of the four-wire transmission facility.

In order to prevent this echo from returning to subscriber B the following occurs. Each received digital code word is also fed to digital level detector 10 which detects and stores the value of the instantaneous analog signal amplitude as represented by each said digital code word. Upon detection of the instantaneous signal level by the digital level detector 10 a pulse is fed to an associated gate generator 15. Gate generator 15 then enables, for 50 msecs, a threshold generator 16 which generates a threshold corresponding to a level 5 dB below the value of the signal amplitude which caused its activation. (The reason for the 50 msec enabling time and the 5 dB value will be hereinafter discussed.) Actually, for each instantaneous signal level detected by digital level detector 10 there is an associated gate generator 15 and threshold generator 16 as will be discussed in relation to FIG. 2.

Threshold generator 16 then adjusts the threshold level stored in digital level comparator 17 to a value equal to 5 dB below the corresponding received instantaneous signal level.

When part of the received analog signal on line 11 is routed through the hybrid 12 to become the return (echo) signal on line 14 it is attenuated by the hybrid 12 by an amount equal to, for example, 6 dB. The echo is then fed to coder 18 which encodes the analog echo signal into a series of digital code words representative of the instantaneous signal amplitude of the echo signal. The digital code words are then fed to digital level comparator 17 where each digital code word is compared to the stored threshold level. If the digital code word is representative of an instantaneous signal level lower than the threshold level then there is no output pulse fed to hangover time generator 19. As a result hangover time generator 19 (hereinafter discussed) neither turns on transmitter 20 nor connects switch 8 to digital attenuator 21. Since transmitter 20 is not turned on the echo is not returned to subscriber B.

The delay time required for the received voice signal to travel between switch 8 and return each echo to the digital level comparator 17 may be about 50 msecs. For this reason, in order for the received signal which caused the adjustment of the threshold in digital level comparator 17 from returning to subscriber B as echo it is important that the threshold level be stored in level comparator 17 for the 50 msec period. This is to insure that the particular received signal which is attenuated 6 dB by hybrid 12 is compared to a threshold level in comparator 17 which is set at only 5 dB below that received signal, thereby causing transmitter 20 not to be turned on.

The transmitter 20 will always be turned off when the received digital code word responsible for the setting of the threshold in digital level comparator 17 is the corresponding echo digital code word which is compared to the threshold. As already noted the threshold set in response to a particular received code word is set for 50 msecs at 5 dB below the actual instantaneous value of that particular signal amplitude. When that signal is reflected by the hybrid 12 onto circuit 14 the hybrid 12 attenuates the signal by at least 6 dB. Therefore, the echo signal fed to digital level comparator 17 is 6 dB lower than the received signal whereas the threshold is set at only 5 dB lower. Therefore, digital level comparator 17 will not enable hangover time generator 19 to turn-on the transmitter 20. Of course, the attenuation values have been given by way of example only. What is important for purposes of break-in and echo suppression, as will be described, is that the threshold level be set higher than the attenuation provided by hybrid 12.

The discussion thus far has been concerned with the detection of one instantaneous signal amplitude level, and the suppression of an echo resulting from that signal. Assuming the digital code word being received represents the initial instantaneous signal amplitude of subscriber B it can then be easily seen how the digital echo suppressor suppresses initial echo.

Upon detection of the initial instantaneous signal level the threshold in digital level comparator 17 is adjusted immediately (due to the speed at which digital circuits operate) to a level 5 dB below the initial instantaneous signal level being detected. If the delay time required for the signal to travel from switch 8 to level comparator 17, via paths 11 and 14, is $< 4$ msec, then the previously mentioned analog devices would not be capable of suppressing this inital echo whereas the relatively inexpensive echo suppressor of the present invention would, in fact, be able to do so.

Two problems associated with echo suppression will not be discussed. While the initial threshold is set for 50 msec at the level corresponding to the initial instantaneous voice level there will be other voice signals from subscriber B being transmitted between the switch 8 and digital level comparator 17. The voice signals will be received by the digital level comparator 17 as one input during the initial 50 msec period. If the voice signals following the initial voice signal are of a level higher than the initial signal level word then level of echo of such higher voice signals could exceed the initial threshold level set in comparator 17, thereby causing the transmitter 20 to be turned on and enabling echo to return to subscriber B. If the voice level from subscriber B is decreasing then, after the 50 msec period during which the initial threshold is set, one approach (not taken by the present invention) would be to set a new threshold in digital level comparator 17 responsive to the particular voice level being detected by the voice level detector 10 at the end of that 50 msec period. However, since it is assumed the signal level being received is decreasing, the new threshold level setting may not be high enough to eliminate echo due to the presence in return path 14 of higher level signals.

The present invention, as will be discussed in relation to FIG. 2, avoids the above two problems. If the level of received voice signal is increasing, then the voice level detector 10, upon detecting a higher signal amplitude level, immediately causes a change in the threshold setting to account for the increased amplitude. If the level of voice signal is decreasing the voice level detector, having stored all values of signal amplitude during the initial 50 msec interval, causes a change in the threshold setting in accordance with the highest amplitude level detected during that 50 msec period.

Figure 2:
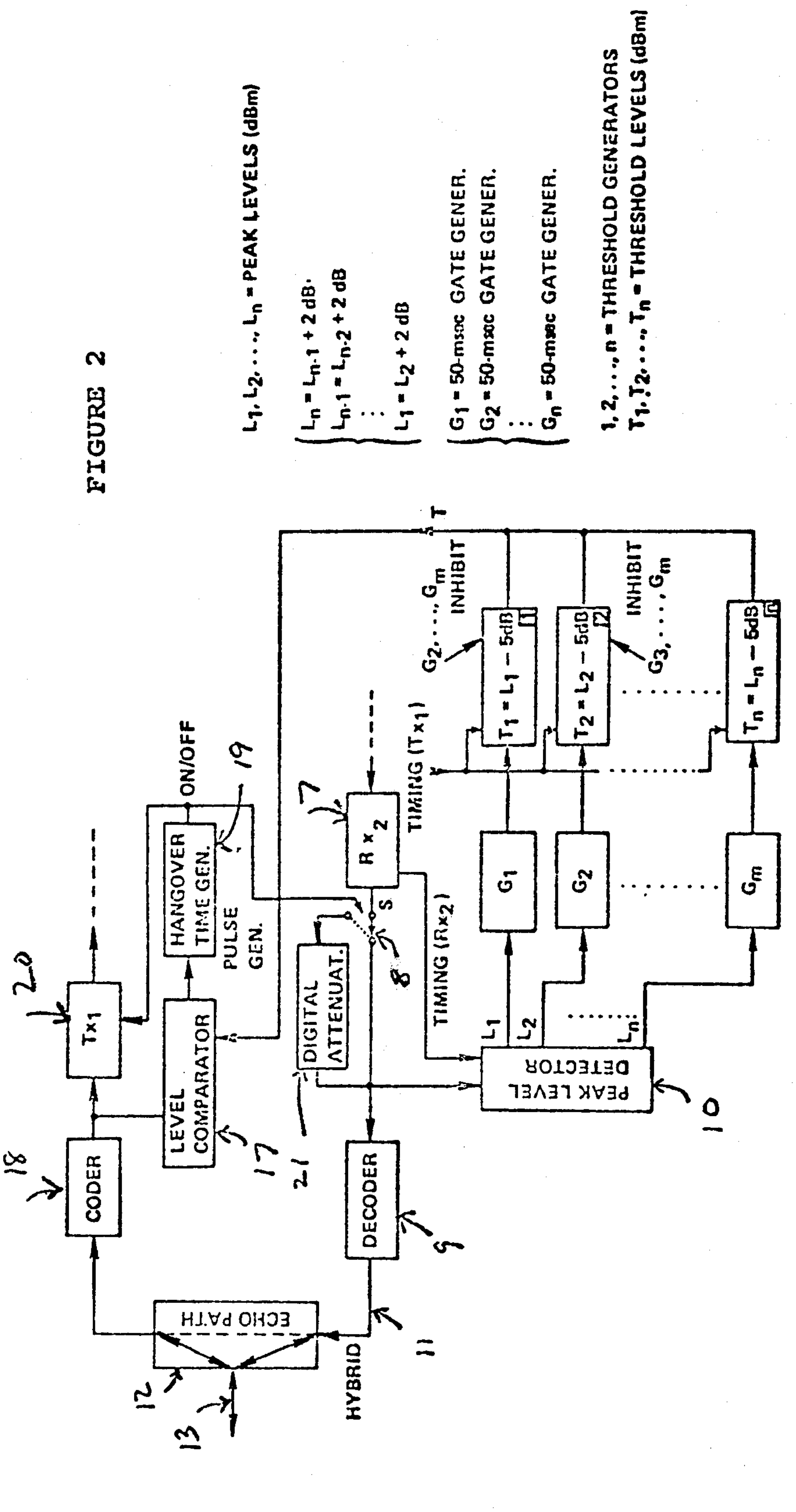
FIG. 2 is a block diagram of the digital echo suppressor showing in more detail certain apparatus of FIG. 1.

Referring to FIG. 2 there is shown in more detail the manner in which the threshold level in digital level comparator 17 is set. Voice level detector 10 detects the level $L_n$ of instantaneous signal amplitude being received from receiver 7. Voice level detector 10, for example, detects in 2 dB steps the level of signal amplitude being received. Each detected signal level $L_n$ opens a respective gate $G_n$ for a period of 50 msecs. The respective gate $G_n$ enables a respective threshold generator $T_n$ having a threshold level which is, for example, 5 dB below the signal level $L_n$ which activated it (assuming hybrid 12 attenuates the activating signal level by 6 dB).

The several gates $G_n$ are independent and as each different instantaneous signal level is detected by voice level detector 10 a respective gate $G_n$ is enabled for 50 msec. However, only one threshold $T_n$ during any period of 50 msec can be activated to control the threshold level in digital level comparator 17. Though upon detection each threshold generator $T_n$ is enabled by its corresponding gate $G_n$ the threshold generators $T_n$ are inhibited from adjusting the threshold level in comparator 17 by all the other open gates $G_n$ relative to a higher signal power level. This means that only the open gate $G_n$ corresponding to the highest detected voice level is able to control the threshold setting in comparator 17.

For example, assume that the instantaneous signal amplitude level of the receiving signal from receiver 7 opens gate $G_4$ at time $t_4$. Gate $G_4$ then enables threshold generator $T_4$ which causes a change in the threshold setting of comparator 17. This threshold level is maintained in comparator 17 for a period of 50 msecs if the following instantaneous signal amplitudes of the receiving signals are lower than the signal amplitude which caused gate $G_4$ to open. These following signals for example, cause gates $G_3$, $G_2$, and $G_1$ to open at the times $t_3$, $t_2$ and $t_1$, respectively. The respective gates $G_3$, $G_2$, $G_1$ remain open for 50 msecs from times $t_3$, $t_2$, $t_1$, respectively. Consequently, gates $G_3$, $G_2$, $G_1$ enable threshold generators $T_3$, $T_2$, $T_1$, respectively. However, threshold generator $T_3$ is inhibited by gate $G_4$, generator $T_2$ is inhibited by gate $G_3$, etc. When the 50 msec period for gate $G_4$ ends generator $T_3$ is no longer inhibited (assuming this threshold represents the highest signal amplitude received during the 50 msec period gate $G_4$ was open) and it thereby causes a change in the threshold setting in comparator 17 accordingly and maintains this level for up to a 50 msec period computed from time $t_3$. If, during any 50 msec period a higher signal level is detected than is responsible for the present threshold setting then the threshold generator $T_n$ generating the present threshold is inhibited and a new threshold level, activated by the higher signal level, is immediately set in comparator 17. In this manner the digital echo suppressor of the present invention insures that the echo problems occurring when received signal power levels are either increasing or decreasing are eliminated.

The digital echo suppressor of the present invention enables a softer talker to break in to the conversation of a louder talker. Assuming subscriber A is a softer talker than subscriber B the former may break in to the speech of the latter by talking as much as 5 dB softer than subscriber B. The reason for this is that when subscriber A is talking his voice signal is digitally encoded in coder 18 and fed to digital level comparator 17. Since the threshold of comparator 17 is set at 5 dB below subscriber B's voice level, if subscriber A is talking up to 5 dB softer, then upon comparison of A's speech with the threshold setting in level comparator 17 a pulse will be generated by comparator 17 which will cause hangover time generator 19 to turn on the transmitter 20 thereby transmitting A's speech.

When hangover time generator 19 turns on transmiter 20 it also immediately operates switch 8 to insert digital attenuator 21 into the receive path. Actually switch 8 always connects digital attenuator 21 in the receive path but when hangover time generator 19 output is "0" the digital attenuator 21 does not attenuate the received signal, as will be hereinafter discussed. If digital attenuator 21 attenuates the receive signal 6 dB, for example, then this attenuation is reflected in the voice level detected by voice level detector 10 which activates a new threshold setting corresponding to an additional 6 dB attenuation or a threshold level setting which is 11 dB below the signal level being received. Consequently, once break-in has occurred subscriber A can maintain the break-in condition by talking as softly as 11 dB lower than subscriber B.

Figure 3:
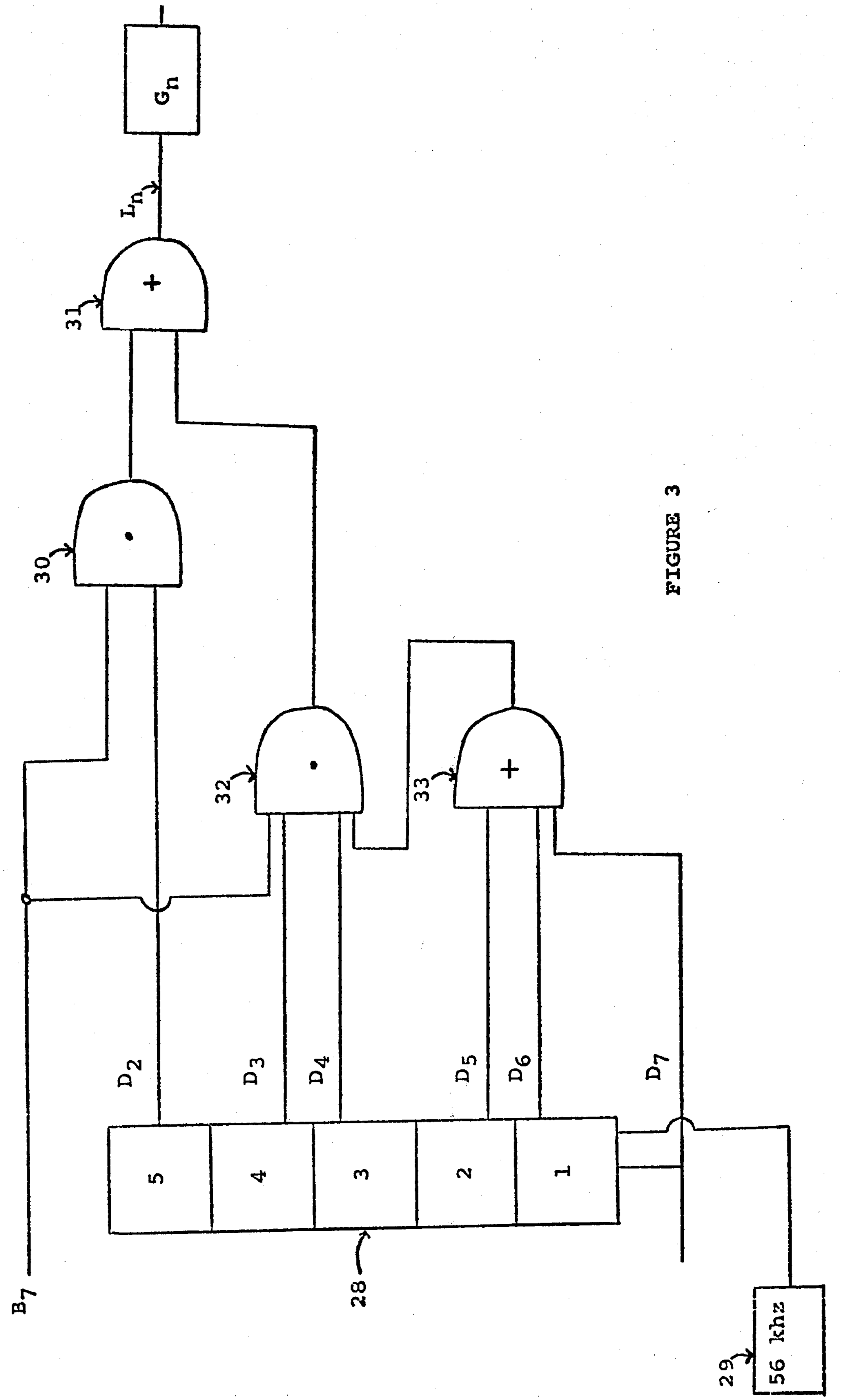
FIG. 3 is a schematic diagram of the digital level detector of FIG. 2.

Referring to FIG. 3 there is shown a schematic diagram of voice level detector 10 capable of detecting any particular level $L_n$. In this discussion it is assumed that the digital code word contains seven bits $D_1-D_7$ wherein the first bit merely represents the sign (+ or −) of the code word, therefore, bit $D_1$ need not be considered. It is further assumed that the code word to be detected is S101000 (S being sign bit $D_1$) and that the next lowest threshold associated with a particular level $L_n$ is S011001.

The serial digital code word S101000 is clocked into 5 bit shift register 28 by clock 29. The bits $D_2-D_7$ are then fed as parallel outputs to the logic elements, as shown, at the time of clock pulse $B_7$ which is phased with bit $D_7$. If bit $D_2$ is a "1" then the code word S101000 is higher than the threshold represented by S011000. At time $B_7$ "And" gate 30 will receive an input from clock $B_7$ and a "1" for bit $D_2$ thereby feeding a pulse to "Or" gate 31 which enables gate generator $G_n$.

If bit $D_2$ of the word to be detected is "0" and bits $D_3$ and $D_4$ are "1" then bits $D_5$ or $D_6$ or $D_7$ should be "1" in order to activate the generator $G_n$ of FIG. 3. From the logic elements 32 and 33 it can easily be seen how gate generator $G_n$ will be activated if the detected code word is above the threshold associated with level S011000. Gate generator $G_n$ will activate its associated threshold generator $T_n$ which will change the threshold in digital level comparator 17 in accordance with the detected code word S101000. Though there is shown here only the logic needed to detect one code word one skilled in the art could easily design the logic needed to detect the digital code words which cause threshold generators $T_n$ to be activated.

Threshold generator $T_n$ associated with a particular gate generator $G_n$ can be a logic "And" gate. The input to the "And" gate would be the pulse from gate generator $G_n$ and frame clock pulses phased with each digit of a PCM word required to generate the appropriate threshold level. For example, if the threshold to be generated by one threshold $T_n$ is S01000 then the logic "And" would be wired to receive a frame clock pulse phased with the "1" bit.

Figure 4:
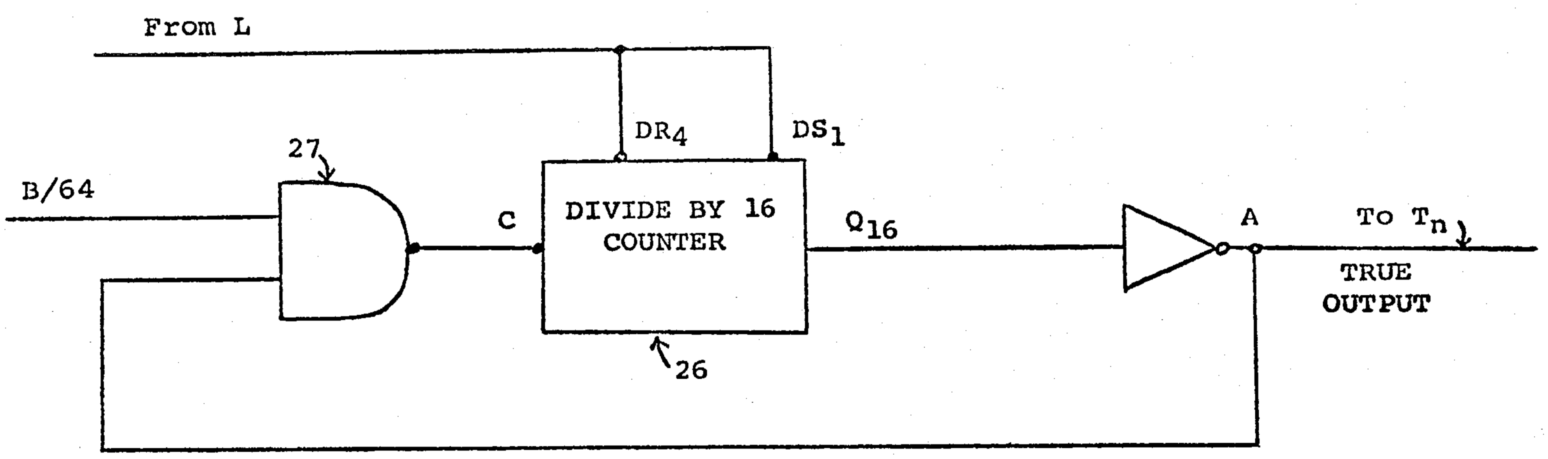
FIG. 4 is a schematic diagram of a gate generator of FIG. 2.

Referring to FIG. 4 there is shown a schematic diagram of one gate generator $G_n$ which can enable its associated threshold generator $T_n$ for a period of 50 msec. The gate generator $G_n$ includes a 4 stage counter 26 which divides by 16 and a "Nand" gate 27 which enables the counter 26 to start counting. When a voice amplitude level $L_n$ is detected a pulse is sent to the counter 26 of gate generator $G_n$. The pulse is fed to the direct set $DS_1$ of the 1st stage and to the direct reset $DR_4$ of the 4th stage. The output $Q_2$ of the 1st stage then goes to logic "1" and the output $Q_{16}$ of the 4th stage goes to logic "0." The output A then goes to logic "1" which then enables the "Nand" gate 27 for clock B/64. Clock B/64, which has a frame period of 8 msecs, then feeds pulses to the counter 26 causing it to count until the last stage output $Q_{16}$ goes to logic "1" which, in turn, causes output A to go to logic "0." When A goes to "0" the Nand gate 27 is not enabled and the counter 26 stops counting until another pulse is received from the voice level detector 10. In this manner a pulse A is produced which starts when the decision is made that an instantaneous voice signal level has reached or exceeded the relative level L. Due to the counter 26 the pulse A will continue for a period of 48–60 msecs. Since pulse A is also fed to threshold generator $T_n$ it enables that generator $T_n$ for the 48–60 msecs period and also inhibits all lower level threshold generators $T_n$.

Figure 5:
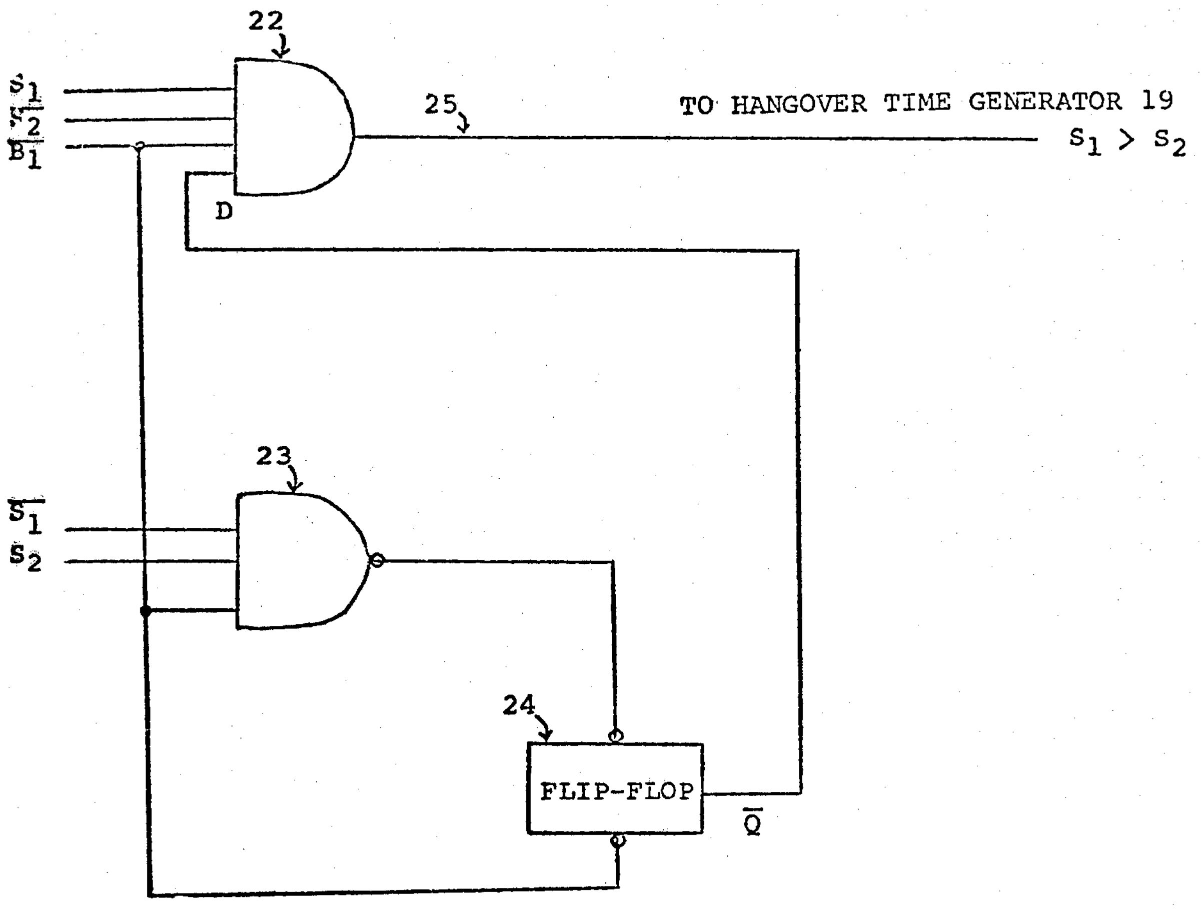
FIG. 5 is a schematic diagram of the digital level comparator of FIG. 2.

Referring to FIG. 5 there is shown a schematic diagram of digital level comparator 17. The circuit determines whether a digital code word is greater than or equal to a set threshold code word by examining in sequence the bits, from most significant to least significant bit, which comprise the code word.

The digital level comparator 17 compares the incoming serial digital code words of two signals $S_1$ and $S_2$ and generates a pulse each time the serial digital comparison detects $S_1 > S_2$.

On examining the bits from most significant to least significant, if the first disagreement shows a "1" in code word $S_1$ and a "0" in code word $S_2$, then $S_1 > S_2$. If, however, the first disagreement shows a "0" in code word $S_1$ and a "1" in code word $S_2$ then $S_2 > S_1$. Code word $S_1$ represents the instantaneous signal level input from coder 18 whereas code word $S_2$ represents the threshold setting as adjusted by threshold generator 16.

The complement of $S_2$ ($S_2$) and the no-complement of $S_1$ are clocked to "And" gate 22. The complement of $S_1$ ($S_1$) and the no-complement of $S_2$ are fed to "NAND" gate 23. A clock $B_1$ (not shown) disables both "And" logic 22 and "NAND" logic 23 when the first bit of the digital bit stream occurs since this bit merely represents the sign (+or−) of the voice signal.

If $S_2 > S_1$ then in the most significant bit there is a "1" in $S_2$ and a "0" in $S_1$. Consequently, "NAND" logic 23 detects this and causes flip-flop 24 to emit pulse Q which disables "And" gate 22. This lasts until the end of digital code word $S_1$. No output is produced at 25 and $S_2 \geq S_1$. If $S_2 = S_1$ then there is no output from flip-flop 24 and no output at 25.

If $S_1 > S_2$ then in the most significant bit there is a "1" in $S_1$ and a "0" in $S_2$. Consequently, "And gate 22 provides a pulse on line 25 when it is not disabled by flip-flop 24. This pulse is fed to hangover time generator 19 which turns on transmitter 20.

Figure 6:
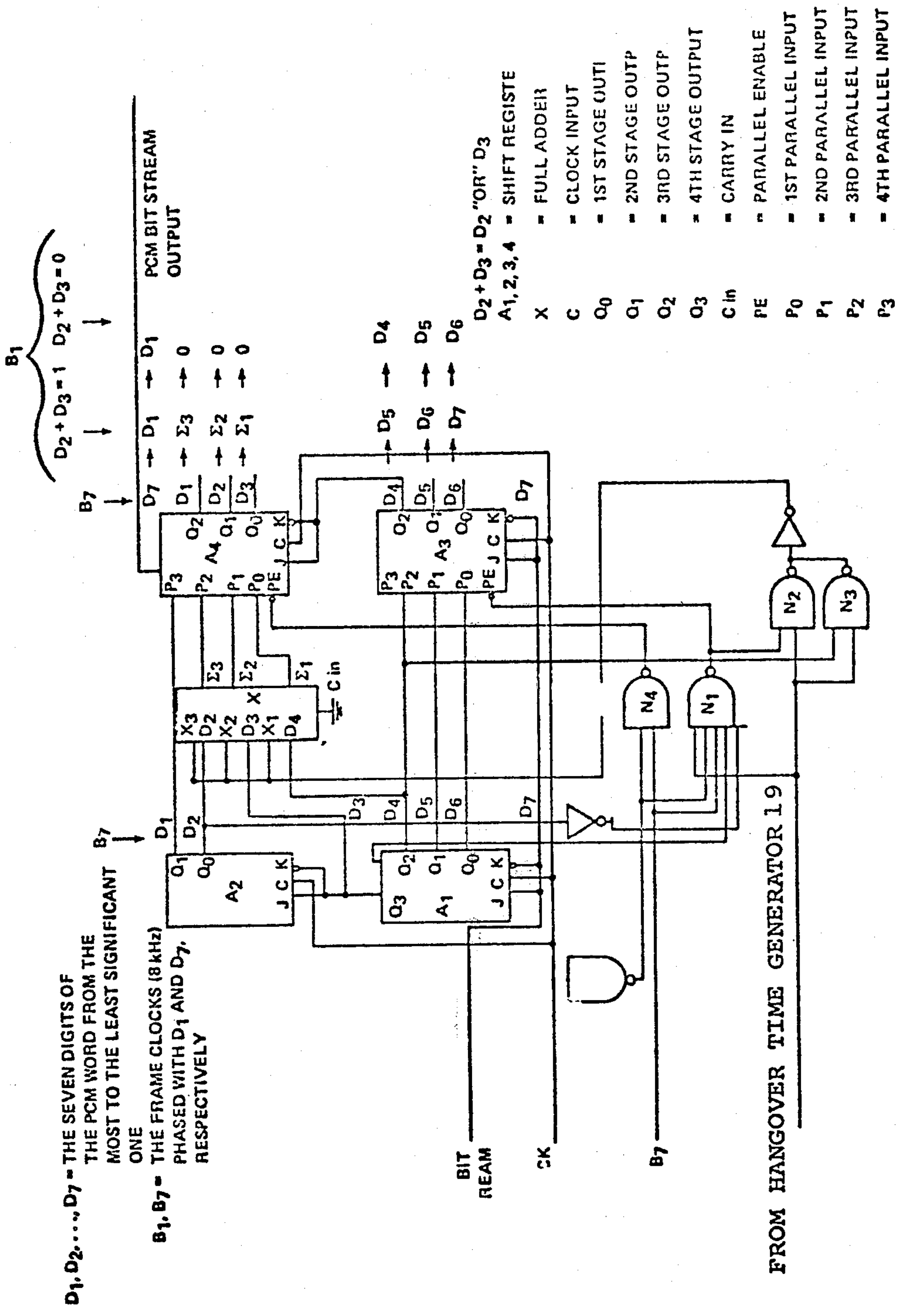
FIG. 6 is a schematic diagram of the digital attenuator of FIG. 2.

Referring to FIG. 6 there is shown a schematic diagram of a digital attenuator 21. The discussion of this device will be based on the assumption that an attenuation of 6 dB is required and that the PCM words are of 7 bit length $D_1 - D_7$ with the first bit of each word representing the sign (+ or −). The following table shows the segments from 0 to 7 wherein each segment represents 8 quantization levels:

| Segment | Compandor Output |
|---|---|
| 7 | S 1 1 1 X Y Z |
| 6 | S 1 1 0 X Y Z |
| 5 | S 1 0 1 X Y Z |
| 4 | S 1 0 0 X Y Z |
| 3 | S 0 1 1 X Y Z |
| 2 | S 0 1 0 X Y Z |
| 1 | S 0 0 1 X Y Z |
| 0 | S 0 0 0 X Y Z |

It is further assumed that the first two segments (0–1) are linearly companded and that segments 2–7 are logarithmetically companded. This means that to attenuate a signal by 6 dB which is represented by the code words of segments 0–1 it is necessary to shift the digital code word one place to the right. That is, if the code word is S001010 then the 6 dB attenuated word would be S000101. To attenuate a signal by 6 dB which is represented by the code words of segments 2–7 it is necessary to shift the respective code words one segment lower. That is, a code word which is represented by segment 6, for example S110111, has to be shifted to the same position of segment 5 (S101111). To perform the latter it is sufficient to subtract the code word from the binary number 8 (001000) since each segment represents 8 quantization levels.

In order to actually subtract a binary code word representing one level from a binary code word representing a higher level the higher level code word can be added to the complement of the lower level code word diminished by 1 without considering the carry out of the sum. Since in this example the subtractor is 8 (001000), the actual number to be considered in attenuating each segment 2–7 by 6 dB is the complement of binary number 7 (111000).

Assuming a received code word fed to digital attenuator 21 is represented in one of the segments 2–7 then the following occurs. The digital code word which is the serial bit stream from receiver 7 is fed to input J of shift registers $A_1$, $A_3$. The signal is shifted a total of 6 digits first through shift register $A_1$ and then via input J through shift register $A_2$. The same occurs for shift registers $A_3$ and $A_4$. The parallel outputs of the shift registers $A_1$ and $A_2$ and the input J of shift register $A_1$ have the code word in parallel form from the most significant bit $D_1$ to the least significant bit $D_7$ as shown in FIG. 6. This occurs when clock $B_7$ (phased with the 7th bit of each PCM word) occurs.

To add the parallel output to the binary code number 111000 a full adder X is necessary. When clock $B_7$ occurs the outputs of full adder X are $\Sigma_3\ \Sigma_2\ \Sigma_1 = D_2\ D_3\ D_4 + 111$ where $\Sigma_3\ \Sigma_2\ \Sigma_1$ are phased with the 2nd, 3rd and 4th digits of the parallel output $D_2\ D_3\ D_4$.

The serial bit stream is also shifted into the first 3 stages of shift register $A_3$ and the stages of shift register $A_4$ via respective inputs J. At the time the clock $B_7$ occurs, the outputs of shift registers $A_3$ and $A_4$ are the parallel representation of the serial bit stream $D_7$ (of the previous code word) and $D_1$, $D_2$, $D_3$, $D_4$, $D_5$, $D_6$, $D_7$, of the present code word. The parallel inputs ($P_0$, $P_1$, $P_2$, $P_3$) determine the conditions of shift registers $A_3$ and $A_4$ respectively whenever the input PE is low and after a low-to-high transition of the clock input $B_7$. When clock $B_7$ enables the input PE of shift register $A_4$ by means of "NAND" gate $N_4$ the next clock pulse provided by the bit clock (56 khz) and phased with pulse $B_1$ determines the outputs $Q_0$, $Q_1$, $Q_2$ and $Q_3$ of register $A_4$ which are the inputs $P_0$, $P_1$, $P_2$, $P_3$ of register $A_4$ which, in turn is $\Sigma_1\ \Sigma_2\ \Sigma_3$ and $D_1$. During this transition the shift register $A_3$ has shifted one digit if its input PE is disabled (high). In this condition the bit stream at the output of the digital attenuator is $D_1\ \Sigma_3\ \Sigma_2\ \Sigma_1\ D_5\ D_6\ D_7$ which is attenuated with respect to the input bit stream output by 8 levels or 6 dB.

If the serial bit stream work is of the type belonging to segment No. 1 (001XYZ) both outputs $D_2$ and $D_3$ are 0. As already mentioned, to attenuate a signal represented by this segment by 6 dB the bits may be shifted to the right one bit. Thus, outputs $D_2\ D_3\ D_4$ will be 0 and $D_5\ D_6\ D_7$ will equal $D_4\ D_5\ D_6$. To provide this $D_2\ D_3\ D_4$ is added to 111 as in the previous case (001 + 111 = 000). $D_4\ D_5\ D_6$ determines the state of $Q_0\ Q_1\ Q_2$ of shift register $A_3$. When clock pulse B7 occurs the parallel enable PE of shift register $A_3$ will be 0 by means of "NAND" gate $N_1$ which detects outputs $D_2 + D_3 = 0$ ($D_2 + D_3$ means $D_2$ or $D_3$). Therefore, $P_0$, $P_1$, $P_2$, $P_3$ of shift register $A_3$ will acquire the same condition as $D_6$, $D_5$, $D_4$ of shift register $A_1$ at the time of clock pulse $B_7$. Inputs $P_0$, $P_1$, $P_2$, $P_3$ of register $A_3$ will be transferred to outputs $Q_0$, $Q_1$, $Q_2$ of register $A_3$, respectively, when the next clock pulse from the bit clock (56 khz)

In this manner the bit stream at the output of the digital attenuator is shifted 1 bit to the right.

If the signal is represented by a PCM word belonging to the first segment (000XYZ) then $X_1$, $X_2$, $X_3$ of full adder X is 0. Consequently, the outputs $Q_0$, $Q_1$, $Q_2$ of shift register $A_4$ are 0. Outputs $D_5$ $D_6$ $D_7$ are shifted one bit to the right to equal $D_4$ $D_5$ $D_6$ as already discussed. The "NAND" gates $N_1$, $N_2$, $N_3$ detect the condition $D_2 + D_3 + D_4 = 0$ and change the states of $X_1$ $X_2$ $X_3$ to 0.

Finally when the hangover time generator 19 output is 0 it disables the parallel inputs of register $A_3$ and changes the state of $X_1$ $X_2$ $X_3$ to 0. This means that full adder X will add a quantity of 0 and register $A_3$ will not be able to shift one bit to the right. Thus, the PCM bit stream input and output of the digital attenuator are equal and the signal is not attenuated.

The hangover time generator 19 may be of a type disclosed in application Ser. No. 19,184 filed by the present inventor entitled Method And Apparatus For Detecting Speech Signals In The Presence of Noise, and assigned to assignee of the present invention. The hangover time generator 19 maintains the transmitter 20 on after the cessation of a speech burst for a period of time equal to the duration of the speech burst but not exceeding a pre-determined maximum. The purpose of this delay is to prevent switching the transmitter 20 on and off between each speech syllable or momentary sound break, thus preventing excessive switching transients and ensuring smooth transmission flow.

What is claimed is:

1. In a communications system having a four-wire transmission circuit connected to a two-wire circuit via a terminal, apparatus for suppressing echo comprising:

a. means for detecting the amplitude level of a signal being received on the receive line of said four-wire circuit;

b. means, connected to said detection means, for generating a threshold level which is a predetermined value less than said detected amplitude level;

c. means, connected to said generating means, for storing, for a predetermined period of time, said threshold level and comparing the amplitude of a signal on the transmit line of said four-wire circuit to said stored threshold level, and d. means, connected to said means for comparing, for maintaining the transmit line of said four-wire circuit disabled if the signal amplitude on the transmit line is less than said stored threshold level.

2. The apparatus of claim 1 wherein said predetermined value is dependent upon the difference in amplitude between the receive line signal and the corresponding echo signal on the transmit line.

3. The apparatus of claim 2 wherein said threshold level is stored for a period of time which is equal to the total delay between the time said receive line signal and its corresponding echo signal are, respectively, first detected by said means for detecting and then compared in said means for comparing.

4. In a telephone communications system having a separate transmit and receive circuit, apparatus for suppressing echo comprising:

a. means for detecting the amplitude levels of a signal being received on said received line;

b. means, connected to said detecting means, for generating for a predetermined period of time for each detected amplitude level a corresponding threshold level which is at a predetermined level less than the detected amplitude level and for activating only one of said thresholds as an output;

c. means, connected to said generating and activating means, for storing said activated threshold level and for comparing the amplitude of a signal on said transmit line to said stored threshold; and d. means, connected to said storing and comparing means, for maintaining said transmit line disabled if the signal amplitude on said transmit line is less than said stored threshold.

5. The apparatus of claim 4 wherein said stored threshold represents the highest signal amplitude level detected during said predetermined period of time.

6. The apparatus of claim 4 wherein, when said received signal amplitude is decreasing, said stored threshold level is adjusted at the end of said predetermined period of time to a threshold level corresponding to the next lower signal amplitude level detected during said predetermined period of time wherein said latter threshold is stored for a period of time up to said predetermined period of time commencing from the detection of said next lower signal.

7. The apparatus of claim 5 wherein, when said receive signal level increases, said stored threshold level is adjusted immediately upon detection of the higher amplitude level to a corresponding higher threshold level for a period of time up to said predetermined period of time.

8. The apparatus of claim 7 wherein said threshold level is dependent upon the difference in amplitude between the receive line signal and the corresponding echo signal on the transmit line.

9. The apparatus of claim 8 wherein said predetermined period of time is equal to the delay time between the time the receive line signal is detected by said means for detecting and the corresponding echo signal in the transmit line is compared.

10. The apparatus of claim 9 wherein said transmit line is enabled when the signal amplitude on said transmit line exceeds the stored threshold.

11. The apparatus of claim 10 further including means, anteriorly connected to said means for detecting, for attenuating the receive line signal amplitude when said stored threshold is exceeded.

12. The apparatus of claim 7 wherein said means for generating and activating comprises:

a. a plurality of gating means, connected to said means for detecting, for emitting enabling pulses for said predetermined period of time wherein each gating means emits an enabling pulse when the receive line signal amplitude exceeds a level associated with that gating means;

b. a plurality of threshold generators, each connected to a respective gating means; and c. means for enabling only the threshold generator corresponding to the highest detected receive line signal amplitude to change the threshold level stored in said means for storing.

13. The apparatus of claim 12 wherein said means for storing and comparing means for digitally comparing, in serial mode commencing with the most significant bit, a digital code word representing the signal on said transmit line and a stored digital code word representing the signal on said transmit line and a stored digital code word representing the threshold level.

14. The apparatus of claim 13 wherein said means for maintaining includes means for maintaining said transmit line enabled for a period of time following the end of an enabling pulse from said comparing and storing means.

* * * * *